US010837766B2

(12) United States Patent
Feng et al.

(10) Patent No.: US 10,837,766 B2
(45) Date of Patent: Nov. 17, 2020

(54) LASER MEASUREMENT SYSTEM AND METHOD FOR MEASURING SIX-DEGREE-OF-FREEDOM GEOMETRIC ERROR OF ROTATING SHAFT

(71) Applicant: Beijing Jiaotong University, Beijing (CN)

(72) Inventors: Qibo Feng, Beijing (CN); Jiakun Li, Beijing (CN); Fajia Zheng, Beijing (CN); Jing Yang, Beijing (CN)

(73) Assignee: Beijing Jiaotong University, Beijing (CN)

( * ) Notice: Subject to any disclaimer, the term of this patent is extended or adjusted under 35 U.S.C. 154(b) by 80 days.

(21) Appl. No.: 16/074,470

(22) PCT Filed: May 11, 2017

(86) PCT No.: PCT/CN2017/083892
§ 371 (c)(1),
(2) Date: Aug. 1, 2018

(87) PCT Pub. No.: WO2018/103268
PCT Pub. Date: Jun. 14, 2018

(65) Prior Publication Data
US 2019/0063910 A1  Feb. 28, 2019

(30) Foreign Application Priority Data

Dec. 9, 2016 (CN) .......................... 2016 1 1131183

(51) Int. Cl.
*G01B 11/27* (2006.01)
*G01B 9/02* (2006.01)
(Continued)

(52) U.S. Cl.
CPC .............. *G01B 11/272* (2013.01); *G01B 9/02* (2013.01); *G01B 11/002* (2013.01); *G01B 11/26* (2013.01)

(58) Field of Classification Search
CPC ........ G01B 9/02; G01B 11/002; G01B 11/26; G01B 11/272
See application file for complete search history.

(56) References Cited

U.S. PATENT DOCUMENTS 4,714,339 A * 12/1987 Lau ........................ B25J 13/089
356/139.08
4,939,678 A * 7/1990 Beckwith, Jr. ....... G01B 11/005
33/1 M
(Continued)

FOREIGN PATENT DOCUMENTS

CN           106595480           4/2017

OTHER PUBLICATIONS

He, Zhenya et al. "A new error measurement method to identify all six error parameters of a rotational axis of a machine tool". International Journal of Machine Tools & Manufacture 88 (2015), published Aug. 11, 2014, pp. 1-8. (Year: 2014).*

(Continued)

*Primary Examiner* — Michael A Lyons
(74) *Attorney, Agent, or Firm* — Rankin, Hill & Clark LLP

(57) ABSTRACT

The present invention discloses a laser measurement system and method for measuring a six-degree-of-freedom geometric error of a rotating shaft. The system comprises a laser emission unit, a six-degree-of-freedom error measurement unit, a six-degree-of-freedom error sensing unit and a servo tracking unit capable of being installed on a rotating shaft to be measured, in which the six-degree-of-freedom error measurement unit enables light to be emergent the six-degree-of-freedom error sensing unit and generates a measuring signal according to emergent light and reflected light and backward reflected light of the six-degree-of-freedom error sensing unit, and the servo tracking unit comprises a four-dimensional adjustment mechanism for realizing four-dimensional adjustment; a motor fixedly installed on the four-dimensional adjustment mechanism; an angle measurement sensor for measuring a rotation angle of the motor; an installation plane fixed on the four-dimensional adjustment mechanism, coaxially rotating with the motor and used for (Continued)

installing the six-degree-of-freedom error sensing unit; and a control circuit for controlling the servo tracking unit according to the measurement signal from the six-degree-of-freedom error measurement unit. The present invention can realize simultaneous and rapid measurement of the six-degree-of-freedom geometric error of the rotating shaft.

9 Claims, 3 Drawing Sheets

(51) Int. Cl.
G01B 11/26 (2006.01)
G01B 11/00 (2006.01)

(56) References Cited

U.S. PATENT DOCUMENTS

| 7,277,811 | B1 * | 10/2007 | Marsh | B23Q 17/22 702/105 |
| 10,145,682 | B2 * | 12/2018 | Sagemueller | G01B 21/045 |
| 10,162,041 | B2 * | 12/2018 | Taketomi | G01S 3/786 |
| 2002/0093663 | A1 * | 7/2002 | Tsai | G11B 5/5552 356/498 |
| 2008/0316497 | A1 * | 12/2008 | Taketomi | G01C 15/002 356/498 |
| 2015/0345937 | A1 * | 12/2015 | Seitz | G01B 21/042 250/231.13 |
| 2017/0003372 | A1 * | 1/2017 | Antoina | G01S 17/66 |
| 2017/0059696 | A1 * | 3/2017 | Ohtomo | G01C 1/02 |
| 2017/0167849 | A1 * | 6/2017 | Feng | G01B 11/02 |

OTHER PUBLICATIONS

Cui, Cunxing et al. "System for simultaneously measuring 6DOF geometric motion errors using a polarization maintaining fiber-coupled dual-frequency laser". Optics Express, vol. 24, No. 6, Mar. 21, 2016, pp. 6735-6748. (Year: 2016).*
Office Action of Chinese patent application No. 201611131183.6, dated Jul. 25, 2018; 5 pages.
Written Opinion and International Search Report of PCT/CN2017/083892, dated Aug. 28, 2017; 10 pages (English and Chinese).

* cited by examiner

LASER MEASUREMENT SYSTEM AND METHOD FOR MEASURING SIX-DEGREE-OF-FREEDOM GEOMETRIC ERROR OF ROTATING SHAFT

FIELD OF THE INVENTION

The disclosed system and method relates to the technical field of spatial geometric accuracy detection, in particular to a laser measurement system and method for measuring a six-degree-of-freedom geometric error of a rotating shaft.

BACKGROUND OF THE INVENTION

Zhenya He, Jianzhong Fu, et al. disclose a method for measuring a six-degree-of-freedom error of a rotating shaft based on laser interference and four-time installation in a paper "A new error measurement method to identify all six error parameters of a rotational axis of a machine Tool." This method uses a dual-pyramid prism as a target lens and two parallel laser interferometers as a light source and detector; enables measurement of light of the laser interferometer to be sequentially in parallel with directions of three linear motion axes of a numerically controlled machine tool or a machining center through four-time installation and by five steps; and uses the laser interferometer to directly measure a six-degree-of-freedom geometric error of each rotating shaft during rotation. However, because this method requires the target lens and the laser interferometers installed four times, it is difficult to install and adjust the measurement system and the measurement efficiency is reduced.

At present, there is no system which has a simple structure, is convenient to operate, and is capable of directly measuring a six-degree-of-freedom geometric error of a rotating shaft through one-time installation.

Therefore, it is required to provide a laser measurement system and method for measuring a six-degree-of-freedom geometric error of a rotating shaft.

SUMMARY OF THE INVENTION

According to one aspect of the present disclosure a laser measurement system and method for measuring a six-degree-of-freedom geometric error of a rotating shaft is provided so as to realize a simultaneous and rapid measurement of the six-degree-of-freedom geometric error of the rotating shaft in precision machining and measurement equipment such as a numerically controlled machine tool or a machining center.

To this end, the system and method adopt technical solutions as described herein.

Directions of X-axis, Y-axis, and Z-axis in the disclosed system and method are consistent with but not limited to directions of X-axis, Y-axis, and Z-axis of vertical machining centers disclosed in ISO10791-2:2001(E).

A laser measurement system for measuring a six-degree-of-freedom geometric error of a rotating shaft provided. The laser measurement system comprises a laser emission unit, a six-degree-of-freedom error measurement unit and a six-degree-of-freedom error sensing unit, in which the six-degree-of-freedom error measurement unit enables light to be emergent to the six-degree-of-freedom error sensing unit and generates a measuring signal according to emergent light and reflected light and backward reflected light of the six-degree-of-freedom error sensing unit. The laser measurement system further comprises a servo tracking unit capable of being installed on a rotating shaft to be measured.

The servo tracking unit includes a four-dimensional adjustment mechanism for realizing four-dimensional adjustment of the servo tracking unit; a motor fixedly installed on the four-dimensional adjustment mechanism; an angle measurement sensor for measuring a rotation angle of the motor; an installation plane fixed on the four-dimensional adjustment mechanism, and coaxially rotating with the motor, which is used for installing the six-degree-of-freedom error sensing unit; and a control circuit for controlling the servo tracking unit according to the measurement signal from the six-degree-of-freedom error measurement unit.

In an embodiment, the control circuit controls the four-dimensional adjustment mechanism to enable the servo tracking unit to be capable of translating along the Y-axis and the Z-axis and enable the servo tracking unit to be capable of rotating around the X-axis and the Y-axis.

In an embodiment, the four-dimensional adjustment mechanism includes a two-dimensional translation adjustment mechanism for adjusting translation of the servo tracking unit along the Y-axis and the Z-axis under the control of the control circuit; and a two-dimensional angle adjustment mechanism used for adjusting rotation of the servo tracking unit around the X-axis and the Y-axis. Alternatively, the four-dimensional adjustment mechanism includes two one-dimensional translation adjustment mechanisms for adjusting translation of the servo tracking unit respectively along the Y-axis and the Z-axis under the control of the control circuit; and two one-dimensional angle adjustment mechanisms used for adjusting rotation of the servo tracking unit respectively around the X-axis and the Y-axis.

In an embodiment, the control circuit controls the motor and the rotating shaft to be measured to rotate in opposite directions.

In an embodiment, the six-degree-of-freedom measurement unit enables linearly polarized light to be emergent to the six-degree-of-freedom error sensing unit and generates the measurement signal according to the linearly polarized light reflected by the six-degree-of-freedom error sensing unit.

In an embodiment, the laser measurement system includes a data processing unit for calculating the six-degree-of-freedom geometric error of the rotating shaft. The six-degree-of-freedom geometric error of the rotating shaft is measured during rotation according to a set rotation angle of the rotating shaft, with the rotation angle of the motor measured by the angle measurement sensor and the measurement signal.

In an embodiment, the six-degree-of-freedom error sensing unit includes a light splitting element for reflecting and transmitting an incident laser beam; a first photoelectric detector for sensing first reflected light from the six-degree-of-freedom error sensing unit; a second photoelectric detector for sensing first backward reflected light from the six-degree-of-freedom error sensing unit; a third photoelectric detector for sensing second backward reflected light from the six-degree-of-freedom error sensing unit; a fourth photoelectric detector for sensing transmitted light of the light splitting element and interference light of the second backward reflected light from the six-degree-of-freedom error sensing unit; and a fifth photoelectric detector for sensing reflected light of the light splitting element.

In an embodiment, the angle measurement sensor is fixed to coaxially rotate with the motor.

A laser measurement method for measuring a six-degree-of-freedom geometric error of a rotating shaft by using the laser measurement system is provided, and the method includes installing the six-degree-of-freedom error sensing unit on the installation plane of the servo tracking unit; and the control circuit controlling the four-dimensional adjustment mechanism according to the measurement signal from the six-degree-of-freedom error measurement unit to enable an emergent light beam from the six-degree-of-freedom error measurement unit to the six-degree-of-freedom error sensing unit and a reflected light beam of the six-degree-of-freedom error sensing unit to be centered, and enable an included angle between the emergent light beam and the reflected light beam to tend to zero.

In an embodiment, the method further includes controlling the motor and the rotating shaft to be measured to rotate in opposite directions to enable first reflected light from the six-degree-of-freedom error sensing unit to be located on a Y-axis centerline of a space rectangular coordinate system in which a photosensitive plane of the six-degree-of-freedom error sensing unit is located, and measuring the rotation angle of the motor; and calculating the six-degree-of-freedom geometric error of the rotating shaft to be measured during rotation according to a set rotation angle of the rotating shaft to be measured.

Beneficial Effects of the Present Invention

The disclosed system and method can detect the six-degree-of-freedom error of a rotating shaft of the numerically controlled machine tool or a machining center through one-time installation only and thus greatly improves the detection efficiency.

The servo tracking unit in the disclosed system and method can decrease the installation time of the measurement instruments, can decrease the installation error, can keep the measurement light to return to the photoelectric detector through servo tracking and can guarantee the normal operation of laser interferometry.

The standard frequency signal for interference-based length measurement in the disclosed system and method and the interference signal including length change are both received by the photoelectric detector in the six-degree-of-freedom error measurement unit, the two loops of signals are both common-loop signals between the laser emission unit and the collimating lens of the six-degree-of-freedom error measurement unit, and thus the measurement error is decreased.

DESCRIPTION OF THE DRAWINGS

The specific embodiments of the disclosed system and method will be further described below in detail in conjunction with the accompanying drawings, wherein.

DESCRIPTION OF THE EMBODIMENTS

Figure 1:
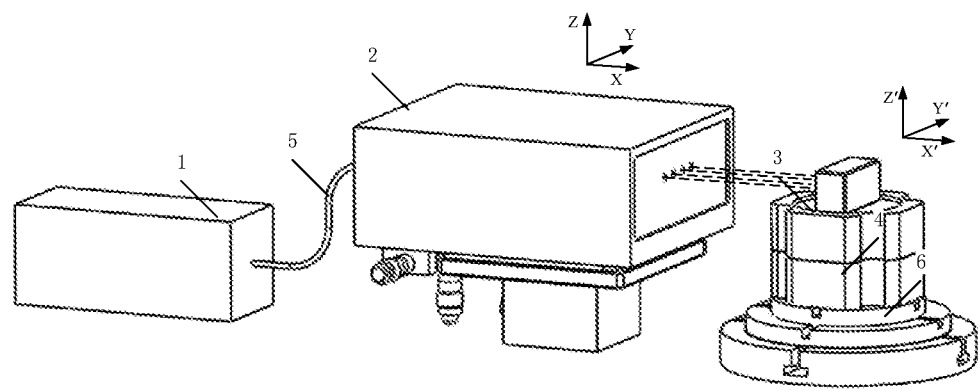
FIG. 1 illustrates a structural stereoscopic view of a laser measurement system for measuring a six-degree-of-freedom geometric error of a rotating shaft of a rotating shaft of a numerically controlled machine tool provided by embodiment 1 and embodiment 2.

In order to more clearly describe the present invention, the present invention will be further described below in combination with the preferred embodiments and drawings. In the drawings, similar components are represented by the same reference numerals. One skilled in the art shall understand that the content specifically described below is descriptive instead of restrictive and shall not limit the protection scope of the present invention.

Embodiment 1

Figure 2:
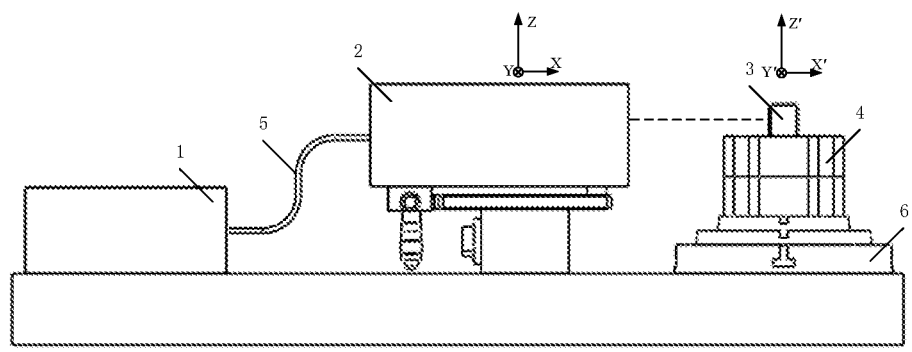
FIG. 2 illustrates a structural side view of the laser measurement system for measuring the six-degree-of-freedom geometric error of the rotating shaft of the rotating shaft of the numerically controlled machine tool provided by embodiment 1 and embodiment 2.

As illustrated in FIG. 1 and FIG. 2, a laser measurement system for measuring a six-degree-of-freedom geometric error of a rotating shaft provided by this embodiment is used for measuring a rotating shaft of a numerically controlled machine tool. The laser measurement system comprises a laser emission unit 1, a six-degree-of-freedom error measurement unit 2, a six-degree-of-freedom error sensing unit 3, and a servo tracking unit 4 capable of being installed on the rotating shaft to be measured, in which the laser emission unit 1 is flexibly connected with the six-degree-of-freedom error measurement unit 2 through a polarization maintaining fiber 5, the six-degree-of-freedom error measurement unit 2 is fixed on a base of the numerically controlled machine tool to be measured, the servo tracking unit 4 is fixed on the rotating shaft 6 of the numerically controlled machine tool to be measured, and a bottom surface of the six-degree-of-freedom error sensing unit 3 is fixed on the servo tracking unit 4. The six-degree-of-freedom error measurement unit 2 enables a light beam to be emergent to the six-degree-of-freedom error sensing unit 3 and generates a measurement signal according to the emergent light and reflected light and backward reflected light of the six-degree-of-freedom error sensing unit 3.

Figure 3:
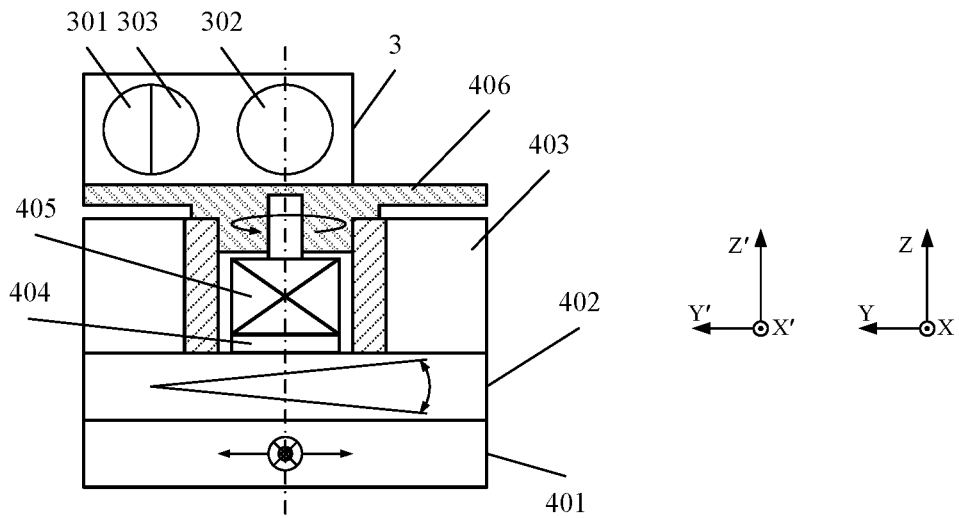
FIG. 3 illustrates a sectional view of a servo tracking unit and an error sensing unit in the embodiment 1.

As illustrated in FIG. 3, the servo tracking unit 4 includes a four-dimensional adjustment mechanism for realizing four-dimensional adjustment of the servo tracking unit 4; a motor 405 fixedly installed on the four-dimensional adjustment mechanism; an angle measurement sensor 403 for measuring a rotation angle of the motor 405; an installation plane 406 fixed on the four-dimensional adjustment mechanism and coaxially rotating with the motor 405, which is used for installing the six-degree-of-freedom error sensing unit 3; and a control circuit 404 for controlling the servo tracking unit 4 according to the measurement signal from the six-degree-of-freedom error measurement unit 2.

Herein, the four-dimensional adjustment mechanism further comprises a two-dimensional translation adjustment mechanism 401 and a two-dimensional angle adjustment mechanism 402.

In order to more clearly illustrate the structure and the functions of the servo tracking unit 4, in this embodiment, a rotating shaft coordinate system X'Y'Z' corresponding to a world coordinate system XYZ in which the machine is located is firstly established, in which a Z'-axis is overlapped with a rotation center axis of the rotating shaft C and is in parallel with the direction of Z-axis, a X'-axis is in parallel with the direction of X-axis, a Y'-axis is in parallel with the direction of Y-axis and a coordinate origin O' is overlapped with a center point of the bottom surface of the servo tracking unit 4. At this moment, the six-degree-of-freedom errors, which need to be measured, of the rotating shaft 6 to be measured respectively are three linearity errors SX, SY and SZ of translation along three directions X, Y and Z, two angle errors EX and EY of rotation around two coordinate axes X and Y, and an angle positioning error EZ of the rotation around the Z-axis.

The two-dimensional translation adjustment mechanism 401 is fixed on the rotating shaft 6 to be measured and the center point of the bottom surface thereof is enabled to be overlapped with the axis center of the rotating shaft 6 during the fixation. Under the control of the control circuit 404, the two-dimensional translation adjustment mechanism 401 is capable of translating along two directions of the Y'-axis and the Z'-axis and is used for laser centering when the six-degree-of-freedom error sensing unit 3 is installed, i.e., enabling a laser light spot received by a third photoelectric detector 218 to be located in a center of a photosensitive surface thereof when the laser is backwards reflected from the six-degree-of-freedom error sensing unit 3 to the six-degree-of-freedom error measurement unit 2.

The two-dimensional angle adjustment mechanism 402 is fixed above the two-dimensional translation adjustment mechanism 401 and the center point of the bottom surface thereof is enabled to be overlapped with the center point of a top surface of the two-dimensional translation adjustment mechanism 401 during the fixation. Under the control of the control circuit 404, the two-dimensional angle adjustment mechanism 402 is capable of rotating around the X'-axis and the Y'-axis and is used for light alignment when the six-degree-of-freedom error sensing unit 3 is installed, i.e., enabling included angles between all reflected light reflected back to the six-degree-of-freedom error measurement unit 2 and the emergent light to tend to zero.

The control circuit 404 is located in a hollow part inside the angle measurement sensor 403. The control circuit 404 and the angle measurement sensor 403 are both fixed above the two-dimensional angle adjustment mechanism 402, and the rotation center axis of the angle measurement sensor 403 is overlapped with the Z'-axis during the fixation.

The motor 405 is fixed on the four-dimensional adjustment mechanism and the rotation center axis of the motor 405 is overlapped with the Z'-axis; and the installation plane 406 is respectively in a tight fit with a rotor of the motor 405 and the angle measurement sensor 403. The control circuit 404 controls the rotor of the motor 405 to rotate and drives the installation plane 406 and the angle measurement sensor 403 and the rotor to rotate at the same angular speed. A rotation angle value $\psi Z'$ of the installation plane 406 measured by the angle measurement sensor 405 is transmitted into the control circuit 404 and then the control circuit 404 sends the rotation angle value $\psi Z'$ to a data processing unit 208 in the six-degree-of-freedom error measurement unit 2.

The control circuit 404 communicates with the six-degree-of-freedom error measurement unit 2 in a wireless manner. In addition, the control circuit 404 is used for controlling the two-dimensional translation adjustment mechanism 401 to perform the laser centering and controlling the two-dimensional angle adjustment mechanism 402 to perform the laser alignment during installation, and is used for controlling the motor 405 to rotate to perform laser servo tracking so as to cause measurement light to return to each photoelectric detector during measurement. The control circuit 404 realizes servo tracking through the following modes: the first photoelectric detector 216 generates a feedback electrical signal according to a distance between a position of a light spot, at the first photoelectric detector 216, of linearly polarized light reflected by the six-degree-of-freedom error sensing unit 3 and a Y-axis center line of a space rectangular coordinate system of the photosensitive surface of the first photoelectric detector 216; the data processing unit 208 generates a servo tracking electrical signal according to the feedback electrical signal and sends the servo tracking electrical signal to the control circuit 404 through wireless communication, and the control circuit 404 controls the motor 405 to rotate according to the servo tracking electrical signal to enable the position of the light spot, at the first photoelectric detector 216, of the linearly polarized light reflected by the six-degree-of-freedom error sensing unit 3 to be located on the Y-axis center line of the space rectangular coordinate system of the photosensitive surface of the first photoelectric detector 216. When the servo tracking is realized, the second photoelectric detector 217 or the third photoelectric detector 218 may also be used for replacing the first photoelectric detector 216 to generate the feedback electrical signal.

Upper and lower positions of the two-dimensional translation adjustment mechanism 401 and the two-dimensional angle adjustment mechanism 402 may be interchangeable. Further, the two-dimensional translation adjustment mechanism 401 may be replaced by using two one-dimensional translation mechanisms used for adjusting translation of the servo tracking unit along the Y-axis and the Z-axis and the two-dimensional angle adjustment mechanism 402 may be replaced by using two one-dimensional angle adjustment mechanisms, so as to establish the four-dimensional adjustment mechanism used for adjusting the servo tracking unit to rotate respectively around the X-axis and the Y-axis.

Figure 4:
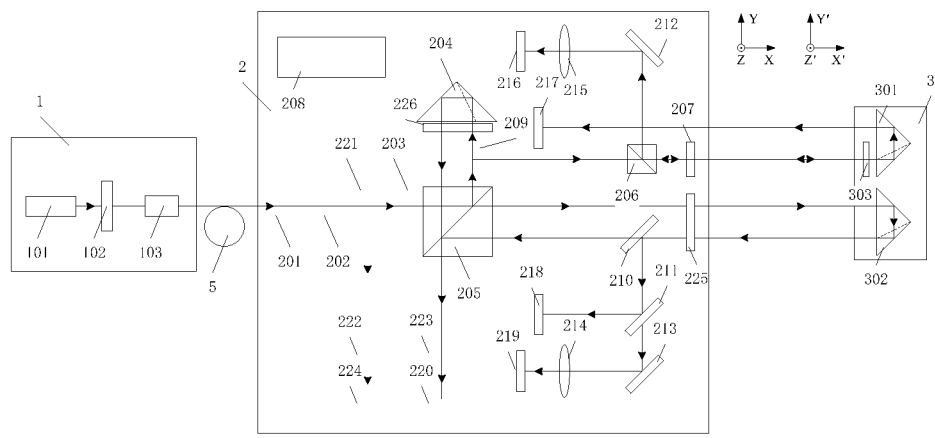
FIG. 4 illustrates an optical path diagram of the laser measurement system for measuring the six-degree-of-freedom geometric error of the rotating shaft of the rotating shaft of the numerically controlled machine tool in embodiment 1.

The laser emission unit 1 with a structure as illustrated in FIG. 4 sequentially comprises a dual-frequency laser 101, a first $\lambda/4$ wave plate 102 and a coupling mirror 103. The dual-frequency laser 101 emits two beams of leftwards and rightwards rotating circularly polarized light which have the same amplitude, are opposite in polarizing directions, and have a certain frequency difference. The two beams of circularly polarized light after passing through the first $\lambda/4$ wave plate 102 become two beams of linearly polarized light A and linearly polarized light B with polarizing directions which are perpendicular to each other. The coupling mirror 103 couples the two beams of linearly polarized light into the polarization maintaining fiber and the first $\lambda/4$ wave plate 102 is rotated to enable the polarizing directions of the two orthogonal beams of linearly polarized light to be aligned with the directions of the two optical axes of the polarization maintaining fiber 5, such that the frequency difference and the polarizing directions of the two orthogonal beams of linearly polarized light are guaranteed to be unchanged in the transmission process of the polarization maintaining fiber 5.

The polarization maintaining fiber 5 may be a butterfly-shaped or panda-shaped polarization maintaining fiber.

The six-degree-of-freedom error sensing unit 3 with a first specific structure as illustrated in FIG. 4 includes a first light backward reflection element 301, a second light backward reflection element 302, and a first light splitting element 303. The two light backward reflection elements 301, 302 are both sensitive to three linearity errors of translation along three coordinate axes, and the combination thereof is sensitive to the angle error of the rotation around the X-axis. The first light splitting element 303 is sensitive to the angle errors of the rotation around the Y-axis and the Z-axis.

The light backward reflection elements 301, 302 may be pyramid prisms or cat's-eye structure prisms. The first light splitting element 303 may be a light splitting film directly coated at a corresponding position of the light backward reflection element.

As illustrated in FIG. 4, the six-degree-of-freedom error measurement unit 2 includes a second light splitting element 221 for reflecting and transmitting an incident laser beam; a first photoelectric detector 216 for sensing first reflected light from the six-degree-of-freedom error sensing unit 3; a second photoelectric detector 217 for sensing first backward reflected light from the six-degree-of-freedom error sensing unit 3; a third photoelectric detector 218 for sensing second backward reflected light from the six-degree-of-freedom error sensing unit 3; a fourth photoelectric detector 220 for sensing transmitted light of the second light splitting element 221 and interference light of the second backward reflected light from the six-degree-of-freedom error sensing unit 3; and a fifth photoelectric detector 224 for sensing reflected light of the second light splitting element 221.

The six-degree-of-freedom error measurement unit 2 with a first specific structure as illustrated in FIG. 4 comprises a fiber emergent end 201, a collimating lens 202, a $\lambda/2$ wave plate 203, a first light polarizing and splitting element 205, a second light polarizing and splitting element 206, second, third, and fourth $\lambda/4$ wave plates 207, 225, 226, the data processing unit 208, a first third light backward reflection element 204, second, third, fourth, and fifth light splitting elements 221, 209, 210, 211, a first planar reflecting mirror 212, a second planar reflecting mirror 213, a first lens 215, a second lens 214, first, second, third, fourth, fifth and sixth photoelectric detectors 216, 217, 218, 220, 224, 219, a first polaroid 222 and a second polaroid 223.

The fiber emergent end 201 enables the linearly polarized light A and linearly polarized light B to be emergent.

The collimating lens 202 is placed on an emergent optical path of the fiber emergent end 201. A distance from the collimating lens 202 to the fiber emergent end 201 is equal to the focal distance of the collimating lens 202, and the collimating lens 202 can expand and collimate the emergent light of the fiber.

The third second light splitting element 221 splits the light beam expanded and collimated by the collimating lens 202 into transmitted light A1 and reflected light A2 of the linearly polarized light A and transmitted light B1 and reflected light B2 of the linearly polarized light B.

The fifth photoelectric detector 224 receives the reflected light A2 and reflected light B2 passing through the first polaroid 222, and generates a fifth electrical signal, i.e., a standard beat frequency signal.

The $\lambda/2$ wave plate 203 enables the polarizing directions of light A1 and light B1 to align with the polarizing directions of the reflected light and the transmitted light of the first light polarizing and splitting element 205 in one-to-one correspondence through rotation, the reflected light of the first light polarizing and splitting element 205 is A1 and the transmitted light is B1; the third light splitting element 209 splits the reflected light A1 of the first light polarizing and splitting element 205 into transmitted light A11 and reflected light A12; and the fourth photoelectric detector 220 receives light A11 which is sequentially transmitted by the fourth $\lambda/4$ wave plate 226, backwards reflected by the first third light backward reflection element 204, transmitted by the third fourth $\lambda/4$ wave plate 226 and changed for 90° in the polarizing direction, transmitted by the first light polarizing and splitting element 205 and passing through the second polaroid 223, as reference light for interferometry.

The fourth light splitting element 210 splits light B1 which is sequentially transmitted by the third $\lambda/4$ wave plate 225, backwards reflected by the second light backward reflection element 302 of the six-degree-of-freedom error sensing unit 3, transmitted by the third $\lambda/4$ wave plate 225 and changed for 90° in polarizing direction into transmitted light B11 and reflected light B12; and the fourth photoelectric detector 220 receives light B11 sequentially reflected by the first light polarizing and splitting element 205 and passing through the second polaroid 223, as signal light for interferometry.

The reference light on the fourth photoelectric detector 220 interferes with the signal light to obtain a fourth electrical signal, i.e., a measurement beat frequency signal.

When the rotating shaft rotates and the six-degree-of-freedom geometric errors are measured, the data processing unit 208 compares the measurement beat frequency signal with the standard beat frequency signal on the fifth photoelectrical detector 224 and calculates the linearity error $\delta X$ of the translation of the rotating shaft along the X-axis.

The linearly polarizing direction of the transmitted light of the second light polarizing and splitting element 206 is consistent with the linearly polarizing direction of the reflected light of the first light polarizing and splitting element 205, and the second $\lambda/4$ wave plate 207 changes light A12 transmitted by the second light polarizing and splitting element 206 from linearly polarized light to circularly polarized light and enables the light to shoot at the first light splitting element 303 in the six-degree-of-freedom error sensing unit 3; the first light splitting element 303 splits light A12 into transmitted light A121 and reflected light A122; and the second photoelectric detector 217 receives the light A121 backwards reflected by the first light backward reflection element 301, measures the change of the position of the light spot and generates a second electrical signal. When the rotating shaft rotates and the six-degree-of-freedom geometric errors are measured, the data processing unit 208 calculates the linearity errors $\delta Y1$ and $\delta Z1$ of the translation of the first light backward reflection element 301 along Y-axis and Z-axis according to the second electrical signal.

The first lens 215 focuses light A122, which is sequentially transmitted by the first second $\lambda/4$ wave plate 207, changed from circularly popularized light to linearly polarized light, changed for 90° in polarizing direction and reflected by the second light polarizing and splitting element 206, onto the first photoelectric detector 216, and the first photoelectric detector 216 measures the change of the position of the light spot and generates a first electrical signal. When the rotating shaft rotates and the six-degree-of-freedom geometric errors are measured, the angular displacement of the first light splitting element 303 relative to the optical axis is measured accordingly, i.e., the data processing unit 208 calculates the angle error $\varepsilon Y$ of rotation of the rotating shaft around the Y-axis, and calculates the angle positioning error $\varepsilon Z$ ($\varepsilon Z=\varepsilon Z0-\varepsilon Z'-\varepsilon Z1$) of rotation of the rotating shaft around Z-axis according to the set rotation angle $\varepsilon Z0$ of the rotating shaft, the rotation angle $\varepsilon Z'$ measured by the angle measurement sensor and the first electrical signal (in which the contained angle positioning error of the rotation of the rotating shaft around the Z-axis is $\varepsilon Z1$). The first reflecting mirror 212 plays a role of enabling the layout of the optical elements and devices in the six-degree-of-freedom error measurement unit 2 to be more compact, so as to decrease the volume of the six-degree-of-freedom error measurement unit 2.

The fifth light splitting element 211 splits light B12 into transmitted light B121 and reflected light B122; and the third photoelectric detector 218 receives light B122, measures the change of the position of the light spot and generates a third electrical signal. When the rotating shaft rotates and the six-degree-of-freedom geometric errors are measured, the data processing unit 208 calculates the linearity errors $\delta Y2$ and $\delta Z2$ of the translation of the second light backward reflection element 302 along the Y-axis and the Z-axis according to the third electrical signal.

The second lens 214 focuses the light B121 on the sixth photoelectric detector 219, and the sixth photoelectric detector 219 measures the change of the position of the light spot and generates a sixth electrical signal. When the rotating shaft rotates and the six-degree-of-freedom geometric errors are measured, the data processing unit 208 calculates the angle drift produced relative to the emergent light of the collimating lens 202 in the space transmission process of the light according to the sixth electrical signal, i.e., the influence caused by air disturbance and mechanical structural deformation, and a compensation may be made to the measurement result according to the angle drift. The second reflecting mirror 213 plays a role of enabling the layout of the optical elements and devices in the six-degree-of-freedom error measurement unit to be more compact, so as to decrease the volume of the six-degree-of-freedom error measurement unit.

When the rotating shaft rotates and the six-degree-of-freedom geometric errors are measured, the data processing unit 208 can calculate the angle error $\varepsilon X$ of the rotation of the rotating shaft around the X-axis by dividing the difference between the vertical linearity errors $\delta Y1$ and $\delta Y2$ of the rotating shaft at two different points of the same horizontal position measured by the second photoelectric detector 217 and the third photoelectric detector 218, by the distance between vertexes of the first light backward reflection element 301 and the second light backward reflection element 302.

The data processing unit 208 can calculate the linearity errors $\delta Y$ and $\delta Z$ of the translation of the rotating shaft along the Y-axis and the Z-axis according to the linearity errors $\delta Y1$ and $\delta Z1$ and/or the linearity errors $\delta Y2$ and $\delta Z2$. Taking the calculation of SY as an example, $\delta Y=\delta Y1$, $\delta Y=\delta Y2$ or $\delta Y=(\delta Y1+\delta Y2)/2$.

Herein, the six-degree-of-freedom error sensing unit is sensitive to six geometric errors of the rotating shaft of the precision machining and measurement equipment such as the numerically controlled machine tool or the machining center, and the six-degree-of-freedom error sensing unit comprises two light backward reflection elements and one light splitting element; the light backward reflection elements are sensitive to three linearity errors of translation along three coordinate axes; the combination of the two light backward reflection elements is sensitive to the angle error of rotation around the X-axis; the light splitting element is sensitive to the two angle errors of rotation around the Y-axis and the Z-axis; and the light backward reflection elements may be pyramid prisms and cat's-eye structure prisms, and the light splitting element may be a light splitting film directly coated at a corresponding position of the light backward reflection element. The transmittance of the first, third, fourth and fifth light splitting elements 303, 209, 210, and 211 is 50%, and the transmittance of the second light splitting element 221 is 80%.

This embodiment further provides a laser measurement method for measuring a six-degree-of-freedom geometric error of a rotating shaft. This method is a method capable of measuring a six-degree-of-freedom geometric error of a rotating shaft of precision machining and measurement equipment such as a numerically controlled machine tool or a machining center through one-time installation. This method includes the following steps: the six-degree-of-freedom error sensing unit 3 is installed on the installation plane of the servo tracking unit 4; the control circuit 404 controls the four-dimensional adjustment mechanism according to the measurement signal from the six-degree-of-freedom error measurement unit 2 to enable an emergent light beam from the six-degree-of-freedom error measurement unit 2 to the six-degree-of-freedom error sensing unit 3 and a reflected light beam of the six-degree-of-freedom error sensing unit 3 to be centered, and enable an included angle between the emergent light beam and the reflected light beam to tend to zero; the motor 404 and the rotating shaft 6 to be measured are controlled to rotate in opposite directions to enable first reflected light from the six-degree-of-freedom error sensing unit 3 to be located on a Y-axis center line of a space defined by a rectangular coordinate system in which a photosensitive plane of the six-degree-of-freedom error sensing unit is located, and a rotation angle of the motor 405 is measured; and the six-degree-of-freedom geometric error of the rotating shaft 6 to be measured during rotation is calculated according to the set rotation angle of the rotating shaft 6 to be measured, the measured rotation angle of the motor 405, and the measurement signal.

The specific process of this method comprises the following steps.

S1: a measurement system is installed. A six-degree-of-freedom error measurement unit 2 is fixed on a base of a numerically controlled machine tool to be measured and the six-degree-of-freedom error measurement unit 2 is adjusted to enable a laser emergent therefrom to be in parallel with the X-axis or the Y-axis. A servo tracking unit 4 is fixed on a rotating shaft-G of the numerically controlled machine tool to be measured and a six-degree-of-freedom error sensing unit 3 is fixed above an installation plane 406 of the servo tracking unit 4.

S2: laser alignment is performed. The laser emergent from a laser emission unit 1 is transmitted into the six-degree-of-freedom error measurement unit 2 through a single polarization maintaining fiber 5 and is emergent from a fiber emergent end 201, emergent light is expanded and collimated by a collimating lens 202 and is split by a second light splitting element 221, transmitted light is incident into a $\lambda/2$ wave plate 203, the $\lambda/2$ wave plate 203 is rotated to enable the polarizing directions of the two orthogonal beams of linearly polarized light emergent from the fiber emergent end 201 to be aligned with the polarizing direction of the transmitted light and the reflected light of a first light polarizing and splitting element 205, so as to enable the strength of the transmitted light and reflected light split by the first light polarizing and splitting element 205 to be equal. The transmitted light and the reflected light are both linearly polarized light and the polarizing directions thereof are orthogonal. The transmitted light of the first light polarizing and splitting element 205 passes through a third λ/4 wave plate 225, then shoots to a second light backward reflection element 302 in the six-degree-of-freedom error sensing unit 3 and is backwards reflected, the reflected light is sequentially transmitted by the third λ/4 wave plate 225 in the six-degree-of-freedom error measurement unit 2, reflected by a fourth light splitting element 210 and a fifth light splitting element 211 and received by a third photoelectric detector 218. When a light spot on the third photoelectric detector 218 is not in the center, it indicates that the six-degree-of-freedom error sensing unit 3 has an installation error in plane Y'O'Z', a control circuit 404 of the servo tracking unit 4 enables a two-dimensional translation adjustment mechanism 401 to translate along two directions, i.e., the Y'-axis and the Z'-axis, according to a light spot coordinate output by the third photoelectric detector 218 till the light spot is located in the center of the third photoelectric detector 218. At this moment the installation error of the six-degree-of-freedom error sensing unit 3 in plane the Y'O'Z' tends to zero and automatic centering is completed.

S3: laser alignment is performed. Reflected light of a first light splitting element 303 in the six-degree-of-freedom error sensing unit 3 passes through the first second λ/4 wave plate 207 in the six-degree-of-freedom error measurement unit 2 and is changed to linearly polarized light from circularly polarized light, but the polarizing direction is changed for 90° as compared with the previous polarizing direction. Thus it can be reflected by a second light polarizing and splitting element 206, then is reflected by a first reflecting mirror 212 and is focused on a first photoelectric detector 216 by a first lens 215, when a light spot on the first photoelectric detector 216 is not in the center, it indicates that there is an included angle between incident light and reflected light of the six-degree-of-freedom error sensing unit 3, the control circuit 404 of the servo tracking unit 4 enables a two-dimensional angle adjustment mechanism 404 to rotate around the X'-axis and the Y'-axis according to a light spot coordinate output by the first photoelectric detector 216 till the reflected light of the six-degree-of-freedom error sensing unit 3 is focused on the center of the first photoelectric detector 216. At this moment the included angle between the incident light and the reflected light of the six-degree-of-freedom error sensing unit 3 tends to zero and automatic alignment is completed.

S4: servo tracking is performed. When a rotating shaft 6 rotates, the first photoelectric detector 216 generates a feedback electrical signal according to a distance between a position of a light spot, at the first photoelectric detector 216, of linearly polarized light reflected by the six-degree-of-freedom error sensing unit 3 and a Y-axis center line of a space rectangular coordinate system of a photosensitive surface of the first photoelectric detector 216. A data processing unit 208 generates a servo tracking electrical signal according to the feedback electrical signal and sends the servo tracking electrical signal to the control circuit 404 through wireless communication, and the control circuit 404 controls the motor 405 and the rotating shaft 6 to rotate in opposite directions according to the servo tracking electrical signal to enable the position of the light spot, at the first photoelectric detector 216, of the linearly polarized light reflected by the six-degree-of-freedom error sensing unit 3 to be located on the Y-axis center line of the space rectangular coordinate system of the photosensitive surface of the first photoelectric detector 216, to realize servo tracking.

S5: six-degree-of-freedom errors of the rotating shaft are measured. The rotating shaft 6 is controlled to rotate clockwise and is rotated to a next measurement point according to angle increment specified in relevant measurement standards or requirements such as ISO230-1. The servo tracking unit 4 rotates at the (relatively) same rotation speed and the (relatively) same rotation angle in the rotation process through servo tracking. The three linear axes and another rotating shaft are kept to be stationary in this process, and the six-degree-of-freedom error measurement unit 2 measures the six-degree-of-freedom error of this point. Accordingly, point-by-point measurement is performed till the rotating shaft 6 rotates for 360° back to the starting point of measurement, the six-degree-of-freedom error of this point is measured and the rotating shaft 6 stops moving. Through the above-mentioned steps, the six-degree-of-freedom errors of all measurement points can be obtained when the rotating shaft 6 rotates clockwise for a circle. The rotating shaft 6 is controlled to rotate anticlockwise according to the same angle increment and point-by-point measurement is performed again to obtain the six-degree-of-freedom errors of all measurement points. Accordingly, the six-degree-of-freedom errors of all measurement points on the rotating shaft 6 during clockwise and anticlockwise rotation can be statically measured point by point, and the six-degree-of-freedom errors of all points on the rotating shaft 6 during clockwise and anticlockwise rotation can be repetitively and statically obtained by repeating the above-mentioned steps. And similarly, the rotating shaft 6 may be controlled to rotate clockwise for a circle at a constant speed from the starting point of measurement and then to rotate anticlockwise for a circle at a constant speed to the starting point of measurement. The six-degree-of-freedom error measurement unit 2 cooperates with the six-degree-of-freedom error sensing unit 3 and the servo tracking unit 4 to continuously perform measurement, and thus the six-degree-of-freedom errors of all specified measurement points on the rotating shaft 6 during clockwise and anticlockwise rotation can be dynamically measured.

S6: data processing is performed to the measured six-degree-of-freedom errors of the rotating shaft. Through the measurement step S5, the six-degree-of-freedom errors of all points on the rotating shaft 6 of precision machining and measurement equipment such as the numerically controlled machine tool or the machining center to be measured during clockwise and anticlockwise rotation can be statically obtained step by step and point by point or continuously and dynamically. By performing data processing according to measurement standards or requirements such as ISO 230-1, the six-degree-of-freedom geometric errors of the rotating shaft 6 can be obtained.

To sum up, the structure of the laser measurement system provided by this embodiment is simple, the system integration level is high and the six-degree-of-freedom geometric errors of the rotation shaft of the precision machining and measurement equipment such as the numerically controlled machine tool or the machining center can be measured through one-time installation.

The volume of the laser measurement system provided by this embodiment is small, the integration level is high, the measurement accuracy is high, the laser drift can be compensated in real time and the anti-interference capability of the system is strong.

Embodiment 2

As illustrated in FIG. 1 and FIG. 2, the structure, the laser emission unit 1 and the servo tracking unit 4 of the laser measurement system for measuring a six-degree-of-freedom geometric error of a rotating shaft of a numerically controlled machine tool are the same as that in embodiment 1, which are not repetitively described herein.

Figure 5:
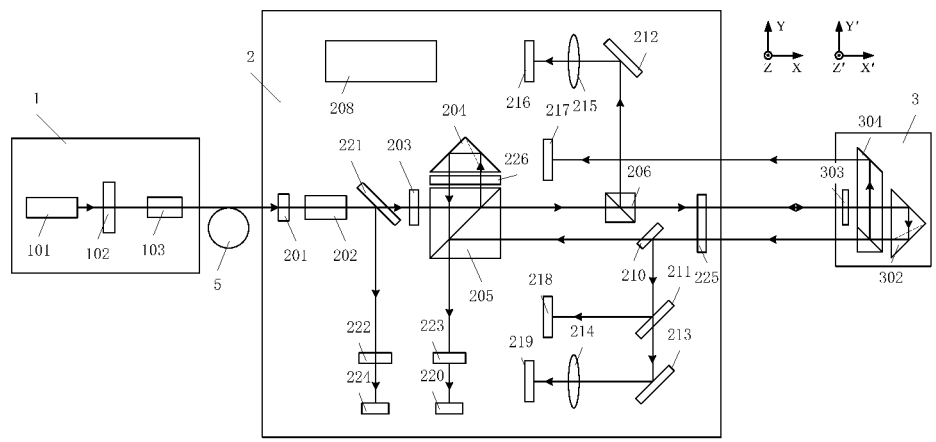
FIG. 5 illustrates an optical path diagram of the laser measurement system for measuring the six-degree-of-freedom geometric error of the rotating shaft of the rotating shaft of a numerically controlled machine tool in embodiment 2.

The six-degree-of-freedom error sensing unit 3 with a second structure as illustrated in FIG. 5 includes a second light backward reflection element 302, a first light splitting element 303 and a light splitting and translation optical axis element 304, in which the second light backward reflection element 302 is sensitive to three linearity errors of translation respectively along three coordinate axes, the light splitting and translation optical axis element 304 is sensitive to angle errors of rotation around X-axis and Y-axis, and the first light splitting element 303 is sensitive to the angle errors of rotation around Y-axis and Z-axis.

As illustrated in FIG. 5, the second light backward reflection element 302 may be a pyramid prism or a cat's-eye structure prism. The first light splitting element 303 may be a light splitting film directly coated at a corresponding position of the light splitting and translation optical axis element 304. The light splitting and translation optical axis element 304 may be a rhombic prism and may also be a combination of a planar spectroscope and a planar reflecting mirror.

The six-degree-of-freedom error measurement unit 2 as illustrated in FIG. 5 includes a fiber emergent end 201, a collimating lens 202, a λ/2 wave plate 203, a first light polarizing and splitting element 205, a second light polarizing and splitting element 206, a data processing unit 208, a third λ/4 wave plate 225, a fourth λ/4 wave plate 226, a third light backward reflection element 204, second, fourth and fifth light splitting elements 221, 209, 210, a first planar reflecting mirror 212, a second planar reflecting mirror 213, a first lens 215, a second lens 214, first, second, third, fourth, fifth and sixth photoelectric detectors 216, 217, 218, 220, 224, 219, a first polaroid 222 and a second polaroid 223.

The laser emission unit 1 emits linearly polarized light C and linearly polarized light D with polarizing directions which are perpendicular to each other and a frequency difference to the six-degree-of-freedom error measurement unit 2, and the fiber emergent end 201 enables the linearly polarized light C and linearly polarized light D to be emergent.

The collimating lens 202 is placed on an emergent optical path of the fiber emergent end 201, a distance to the fiber emergent end 201 is equal to the focal distance of the collimating lens 202 and the collimating lens 202 can expand and collimate the emergent light of the fiber.

The second light splitting element 221 splits the light beam expanded and collimated by the collimating lens 202 into transmitted light C1 and reflected light C2 of the linearly polarized light C and transmitted light D1 and reflected light D2 of the linearly polarized light D.

The fifth photoelectric detector 224 receives the reflected light C2 and reflected light D2 passing through the first polaroid 222, and generates a fifth electrical signal, i.e., a standard beat frequency signal.

The λ/2 wave plate 203 enables the polarizing directions of the light C1 and the light D1 to align with the polarizing directions of the reflected light and the transmitted light of the first light polarizing and splitting element 205 in one-to-one correspondence through rotation, in which the reflected light of the first light polarizing and splitting element 205 is C1 and the transmitted light is D1. The fourth photoelectric detector 220 receives the light C1 which is sequentially transmitted by the fourth λ/4 wave plate 226, backwards reflected by the third light backward reflection element 204, transmitted by the third fourth λ/4 wave plate 226 and changed for 90° in the polarizing direction, transmitted by the first light polarizing and splitting element 205 and passing through the second polaroid 223, as reference light for interferometry.

The transmitting direction of the linearly polarized light of the second light polarizing and splitting element 206 is consistent with the transmitting direction of the linearly polarized light of the first light polarizing and splitting element 205, and the third λ/4 wave plate 225 changes the light D1 transmitted by the second light polarizing and splitting element 206 from linearly polarized light to circularly polarized light and enables the light to shoot at the first light splitting element 303 in the six-degree-of-freedom error sensing unit 3; the first light splitting element 303 splits light D1 into transmitted light D11 and reflected light D12; the light splitting and translation optical axis element 304 spits light D11 which is sequentially transmitted by the light splitting and translation optical axis element 304 and backwards reflected by the second light backward reflection element 302 into transmitted light D111 and reflected light D112; the fourth light splitting element 210 splits light D111, which is transmitted by the third λ/4 wave plate 225, changed from circularly polarized light to linearly polarized light and changed for 90° in polarizing direction, into transmitted light D1111 and reflected light D1112; and the fourth photoelectric detector 220 receives light D1111 sequentially reflected by the first light polarizing and splitting element 205 and passing through the second polaroid 223, as signal light for interferometry.

The reference light on the fourth photoelectric detector 220 interferes with the signal light to obtain a fourth electrical signal, i.e., a measurement beat frequency signal. When the rotating shaft rotates and the six-degree-of-freedom geometric errors are measured, the data processing unit 208 compares the measurement beat frequency signal with the standard beat frequency signal on the fifth photoelectrical detector 224 and calculates the linearity error δX of the translation of the measured rotating shaft along the X-axis.

The second photoelectric detector 217 receives the light D112 translated and reflected by the light splitting and translation optical axis element 304, measures the change of the position of the light spot and generates a second electrical signal. When the rotating shaft rotates and the six-degree-of-freedom geometric errors are measured, the data processing unit 208 calculates the linearity errors δY1 and δZ1 of the translation of the second light backward reflection element 302 along the Y-axis and the Z-axis according to the second electrical signal.

The first lens 215 focuses the light D12, which is sequentially transmitted by the third λ/4 wave plate 225, changed from circularly popularized light to linearly polarized light, changed for 90° in polarizing direction and reflected by the second light polarizing and splitting element 206, onto the first photoelectric detector 216, and the first photoelectric detector 216 measures the change of the position of the light spot and generates a first electrical signal. When the rotating shaft rotates and the six-degree-of-freedom geometric errors are measured, the angular displacement of the first light splitting element 303 relative to the optical axis is measured accordingly, i.e., the data processing unit 208 calculates the angle error εY of the rotation of the rotating shaft around the Y-axis, and calculates the angle positioning error εZ (εZ=εZ0−εZ'−εZ1) of the rotation of the rotating shaft around the Z-axis according to the set rotation angle εZ0 of the rotating shaft, the rotation angle εZ' measured by the angle measurement sensor and the first electrical signal (in which the contained angle positioning error of rotation of the rotating shaft around Z-axis is εZ1). The first reflecting mirror 212 plays a role of enabling the layout of the optical elements and devices in the six-degree-of-freedom error measurement unit to be more compact, so as to decrease the volume of the six-degree-of-freedom error measurement unit 2.

The fifth light splitting element 211 splits the light D1112 into transmitted light D11121 and reflected light D11122; and the third photoelectric detector 218 receives light D11122, measures the change of the position of the light spot and generates a third electrical signal. When the rotating shaft rotates and the six-degree-of-freedom geometric errors are measured, the data processing unit 208 calculates the other linearity errors δY2 and δZ2 of the translation of the second light backward reflection element 302 along the Y-axis and the Z-axis according to the third electrical signal.

The second lens 213 focuses light D11121 on the sixth photoelectric detector 219, and the sixth photoelectric detector 219 measures the change of the position of the light spot and generates a sixth electrical signal. When the rotating shaft rotates and the six-degree-of-freedom geometric errors are measured, the data processing unit 208 calculates the angle drift produced relative to the emergent light of the collimating lens 202 in the space transmission process of the light according to the sixth electrical signal, i.e., the influence caused by air disturbance and mechanical structural deformation, and a compensation may be made to the measurement result according to the angle drift. The second reflecting mirror 213 plays a role of enabling the layout of the optical elements and devices in the six-degree-of-freedom error measurement unit to be more compact, so as to decrease the volume of the six-degree-of-freedom error measurement unit (being the same as embodiment 1).

When the rotating shaft rotates and the six-degree-of-freedom geometric errors are measured, and the data processing unit 208 can calculate the angle error εX of the rotation of the rotating shaft around X-axis by dividing the difference between the vertical linearity errors δY1 and δY2 of the rotating shaft at two different points of the same horizontal position measured by the second and the third photoelectric detector 217, 218, by the translated distance of light by the light splitting and translation optical axis element 304.

The data processing unit 208 can obtain the linearity errors δY and δZ of the translation of the rotating shaft along the Y-axis and the Z-axis according to the linearity errors δY1 and δZ1 or the linearity errors δY2 and δZ2 (being the same as the embodiment 1).

The light splitting and translation optical axis element 304 may be a rhombic prism and may also be a combination of a planar spectroscope and a planar reflecting mirror. The transmittance of the fourth light splitting element 210 is 50%, the transmittance of the second light splitting element 221 is 80%, the transmittance of the fifth light splitting element 211 is 50% and the transmittance of the first light splitting element 303 is 50%.

This embodiment provides a method capable of measuring a six-degree-of-freedom error of a rotating shaft of precision machining and measurement equipment such as a numerically controlled machine tool or a machining center through one-time installation, which is substantially consistent with the method provided in embodiment 1. Differences lie in the structures of the used six-degree-of-freedom error measurement unit 2 and the six-degree-of-freedom error sensing unit 3, which are not repetitively described here.

Embodiment 3

Figure 6:
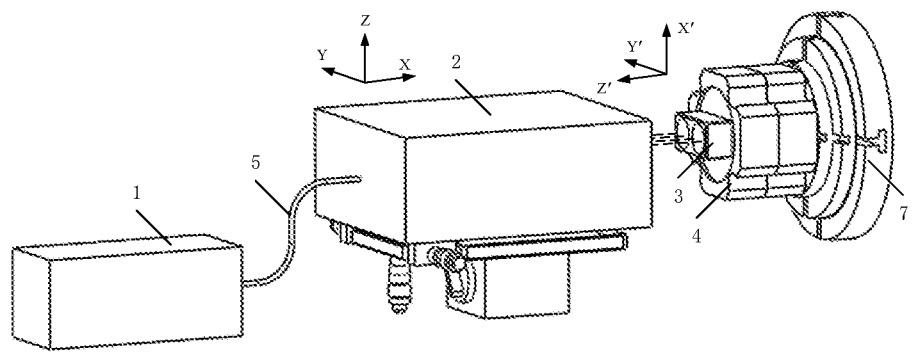
FIG. 6 illustrates a structural stereoscopic view of the laser measurement system for measuring the six-degree-of-freedom geometric error of the rotating shaft of a rotating shaft of a numerically controlled machine tool provided by embodiment 3.
Figure 7:
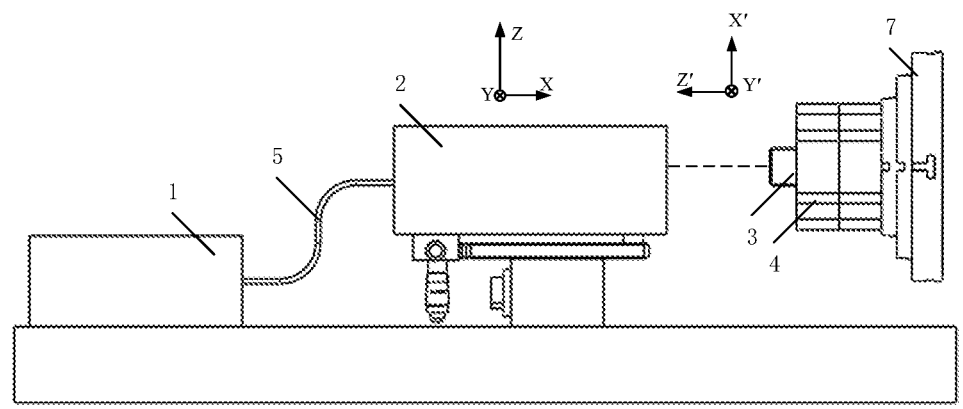
FIG. 7 illustrates a structural side view of the laser measurement system for measuring the six-degree-of-freedom geometric error of the rotating shaft of the rotating shaft of the numerically controlled machine tool provided by embodiment 3.
Figure 8:
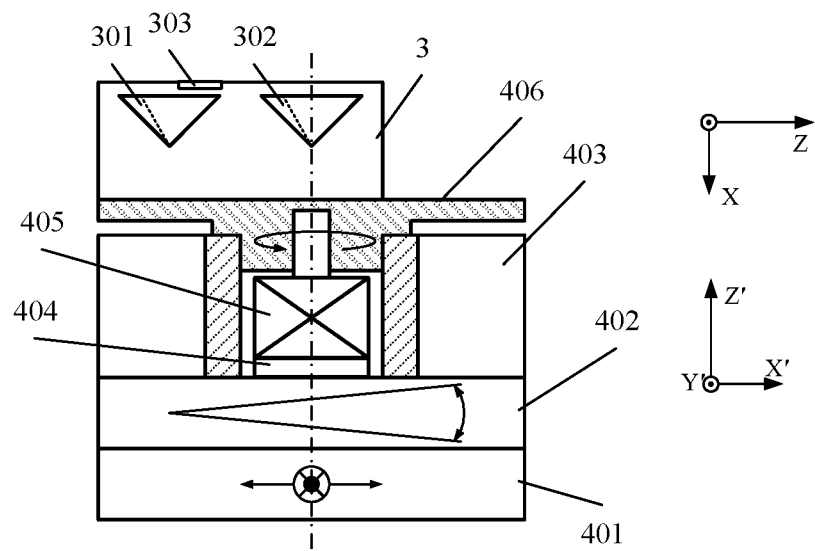
FIG. 8 illustrates a sectional view of the servo tracking unit and the error sensing unit in embodiment 3.

As illustrated in FIG. 6 and FIG. 7, a laser measurement system for measuring a six-degree-of-freedom geometric error of a rotating shaft according to the present invention is used for measuring a rotating shaft 7 of a numerically controlled machine tool, main components thereof are fully consistent with those in embodiment 1, and differences lie in the installation modes of the six-degree-of-freedom error sensing unit 3 and the servo tracking unit 4. As illustrated in FIG. 8, the rear surface of the six-degree-of-freedom error sensing unit 3 is fixed on the servo tracking unit 4.

When the rotating shaft A shaft 7 is measured, the relationship between the world coordinate system XYZ of the machine tool and the coordinate system X'Y'Z' of the rotating shaft 7 is as follows: the Z'-axis is overlapped with the rotating center axis of the rotating shaft 7 and is in parallel with and opposite to the direction of the X-axis, the X'-axis is in parallel with and opposite to the direction of the Y-axis, the Y'-axis is in parallel with and opposite to the direction of Z-axis and the coordinate origin O' is overlapped with the center point of the bottom surface of the servo tracking unit 4. At this moment the six-degree-of-freedom errors which need to be measured are respectively: three linearity errors δX, δY and δZ of translation along three directions X, Y and Z, two angle errors εY and εZ of rotation around two coordinates axes Y and Z, and an angle positioning error εX of rotation around the X-axis.

This embodiment provides a method for measuring a six-degree-of-freedom geometric error of the rotating shaft 7 through one-time installation, which is substantially the same as the method provided in embodiment 1, a difference only lies in the step S1 in the specific process, thus step S1 is only described and steps S2-S6 are not repetitively described herein.

S1: a measurement system is installed. A six-degree-of-freedom error measurement unit 2 is fixed on a base of a numerically controlled machine tool to be measured and the six-degree-of-freedom error measurement unit 2 is adjusted to enable a laser emergent therefrom to be in parallel with the X-axis. A servo tracking unit 4 is fixed on a rotating shaft 7 and a rear surface of a six-degree-of-freedom error sensing unit 3 is fixed above an installation plane 406 of the servo tracking unit 4.

Obviously, the above-mentioned embodiments of the present invention are just examples for clearly describing the disclosed system and method, and are not limitations to the implementation of modes of the disclosed system and method. One skilled in the art may make other different variations or changes based on the description, all implementation modes cannot be exhausted here, and obvious variations or changes derived from the technical solution of the disclosed system and method shall be still included in the protective scope of the disclosed system and method.

The invention claimed is:
1. A laser measurement system for measuring a six-degree-of-freedom geometric error of a rotating shaft, comprising a laser emission unit, a six-degree-of-freedom error measurement unit and a six-degree-of-freedom error sensing unit, in which the six-degree-of-freedom error measurement unit enables light to be emergent to the six-degree-of-freedom error sensing unit and generates a measuring signal according to the emergent light and reflected light and backward reflected light of the six-degree-of-freedom error sensing unit,
wherein, the laser measurement system further comprises a servo tracking unit capable of being installed on a rotating shaft to be measured, and the servo tracking unit comprises:
a four-dimensional adjustment mechanism for realizing four-dimensional adjustment of the servo tracking unit, the four-dimensional adjustment mechanism including:
a two-dimensional translation adjustment mechanism fixed on the rotating shaft for adjusting translation of the servo tracking unit with a bottom surface thereof overlapped with an axis center of the rotating shaft; and
a two-dimensional angle adjustment mechanism used for adjusting rotation of the servo tracking unit, the two-dimensional angle adjustment mechanism being fixed above the two-dimensional translation adjustment mechanism with a bottom surface thereof overlapped with a top surface of the two-dimensional translation adjustment mechanism;
a motor fixedly installed on the four-dimensional adjustment mechanism;
an angle measurement sensor for measuring a rotation angle of the motor;
an installation plane on which the six-degree-of-freedom error sensing unit is installed, the installation plane being fixed on the four-dimensional adjustment mechanism for coaxially rotating with the motor; and
a control circuit for controlling the servo tracking unit according to the measurement signal from the six-degree-of-freedom error measurement unit.

2. The laser measurement system according to claim 1, wherein, the control circuit controls the four-dimensional adjustment mechanism to enable the servo tracking unit to be capable of translating along Y-axis and Z-axis and enable the servo tracking unit to be capable of rotating around X-axis and the Y-axis.

3. The laser measurement system according to claim 1, wherein, the control circuit controls the motor and the rotating shaft to be measured to rotate in opposite directions.

4. The laser measurement system according to claim 1, wherein, the six-degree-of-freedom error measurement unit enables linearly polarized light to be emergent to the six-degree-of-freedom error sensing unit and generates the measurement signal according to the linearly polarized light reflected by the six-degree-of-freedom error sensing unit.

5. The laser measurement system according to claim 1, wherein, the laser measurement system further comprises a data processing unit for calculating the six-degree-of-freedom geometric error of the rotating shaft to be measured during rotation according to a set rotation angle of the rotating shaft to be measured, the rotation angle of the motor measured by the angle measurement sensor and the measurement signal.

6. The laser measurement system according to claim 1, wherein, the six-degree-of-freedom error measurement unit comprises:
a light splitting element for reflecting and transmitting an incident laser beam;
a first photoelectric detector for sensing first reflected light from the six-degree-of-freedom error sensing unit;
a second photoelectric detector for sensing first backward reflected light from the six-degree-of-freedom error sensing unit;
a third photoelectric detector for sensing second backward reflected light from the six-degree-of-freedom error sensing unit;
a fourth photoelectric detector for sensing transmitted light of the light splitting element and interference light of the second backward reflected light from the six-degree-of-freedom error sensing unit; and
a fifth photoelectric detector for sensing reflected light of the light splitting element.

7. The laser measurement system according to claim 1, wherein, the angle measurement sensor is fixed to coaxially rotate with the motor.

8. A laser measurement method for measuring a six-degree-of-freedom geometric error of a rotating shaft by using the laser measurement system according to claim 1, wherein, the method comprises:
installing the six-degree-of-freedom error sensing unit on the installation plane of the servo tracking unit;
measuring a change in position of a light spot at the six-degree-of-freedom error sensing unit and generating a feedback electrical signal according to a position of the light spot at the six-degree-of-freedom error sensing unit, the feedback electrical signal being directed to the control circuit as the measurement signal; and
controlling the four-dimensional adjustment mechanism with the control circuit according to the measurement signal from the six-degree-of-freedom error measurement unit to enable an emergent light beam from the six-degree-of-freedom error measurement unit to the six-degree-of-freedom error sensing unit and a reflected light beam of the six-degree-of-freedom error sensing unit to be centered, and enable an included angle between the emergent light beam and the reflected light beam to tend to zero.

9. The laser measurement method for measuring the six-degree-of-freedom
geometric error of the rotating shaft according to claim 8, wherein, the method further comprises:
controlling the motor and the rotating shaft to be measured to rotate in opposite directions to enable first reflected light from the six-degree-of-freedom error sensing unit to be located on a Y-axis centerline of a space rectangular coordinate system in which a photosensitive plane of the six-degree-of-freedom error sensing unit is located, and measuring the rotation angle of the motor; and
calculating the six-degree-of-freedom geometric error of the rotating shaft to be measured during rotation according to a set rotation angle of the rotating shaft to be measured, the measured rotation angle of the motor and the measurement signal.

* * * * *